United States Patent
Yap et al.

(10) Patent No.: US 9,664,537 B2
(45) Date of Patent: May 30, 2017

(54) SYSTEM AND ASSEMBLY STRUCTURE FOR ALIGNING AN ENCODER

(71) Applicant: Avago Technologies General IP (Singapore) Pte. Ltd., Singapore (SG)

(72) Inventors: Kek Leong Yap, Bayan Lepas (MY); Siow Ming Tan, Penang (MY); Cheng Kwong Cheang, Penang (MY)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 463 days.

(21) Appl. No.: 14/168,569

(22) Filed: Jan. 30, 2014

(65) Prior Publication Data

US 2015/0211897 A1    Jul. 30, 2015

(51) Int. Cl.
*G01D 5/347* (2006.01)
*G01D 5/244* (2006.01)

(52) U.S. Cl.
CPC ....... *G01D 5/3473* (2013.01); *G01D 5/24442* (2013.01); *G01D 5/34707* (2013.01)

(58) Field of Classification Search
CPC ... G01B 11/0625; G01C 19/64; G01C 19/721
USPC ........... 250/231.13–231.18, 239; 341/13, 14; 356/614–622; 359/436, 442; 33/1 N, 33/1 L; 74/813 C; 248/637, 660
See application file for complete search history.

(56) References Cited

U.S. PATENT DOCUMENTS

| | | | | |
|---|---|---|---|---|
| 6,166,374 A * | 12/2000 | Snyder | ............... | G01D 5/34738 250/231.13 |
| 6,194,709 B1 * | 2/2001 | Briggs | ................... | B62D 15/02 250/231.14 |
| 6,215,119 B1 * | 4/2001 | Markham | .............. | G01D 5/244 250/231.14 |
| 6,452,160 B1 * | 9/2002 | Mitterreiter | .......... | G01D 5/3473 250/231.18 |
| 7,205,530 B2 * | 4/2007 | Jones | ..................... | G01D 11/16 250/231.13 |
| 7,601,948 B1 * | 10/2009 | Setbacken | .......... | G01D 5/34738 250/231.13 |
| 7,637,019 B2 * | 12/2009 | Brandl | ................. | G01D 11/245 250/231.13 |
| 7,939,795 B2 * | 5/2011 | Powell | ............... | G01D 5/34707 250/231.13 |
| 2007/0069594 A1 * | 3/2007 | Braun | ..................... | F16D 1/095 310/79 |
| 2007/0096018 A1 * | 5/2007 | Yoshioka | ........... | G01D 5/34738 250/231.13 |

(Continued)

*Primary Examiner* — Francis M Legasse, Jr.
(74) *Attorney, Agent, or Firm* — Sheridan Ross P.C.

(57) ABSTRACT

In one embodiment, an encoder system comprising an encoder assembly and an encoder alignment structure is disclosed. The encoder assembly may include at least a detector, a hub, a housing, an index sensor of the detector, and a coding member having an index mark. The encoder alignment structure may have a projecting structure. The detector may be coupled with the housing, and the projecting structure may slideably engage the hub so as to align the index mark of the coding member with the index sensor of the detector in a first alignment arrangement. In another embodiment, an encoder assembly configured for receiving an alignment structure having a projecting structure is disclosed.

20 Claims, 17 Drawing Sheets

(56) References Cited

U.S. PATENT DOCUMENTS

2010/0155586 A1\* 6/2010 Chin ................. G01D 5/34715
    250/231.1
2011/0177731 A1\* 7/2011 Zottele .................... G01D 5/04
    440/53

\* cited by examiner

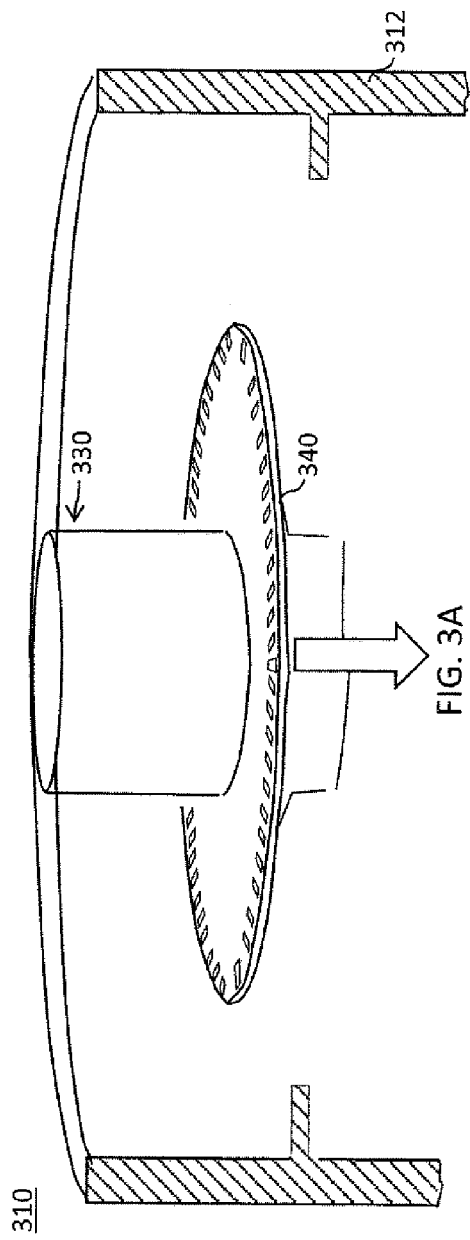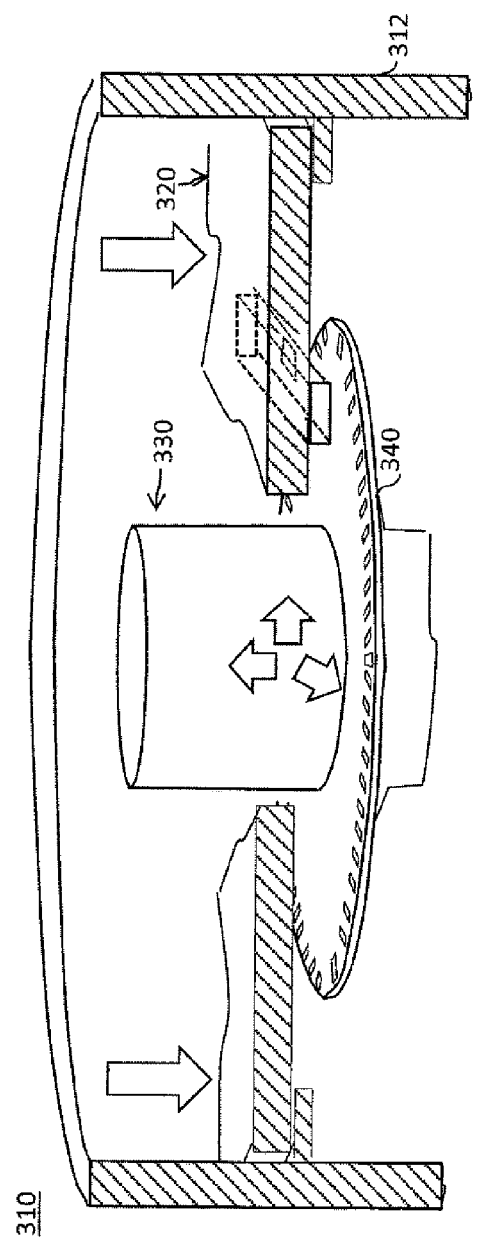

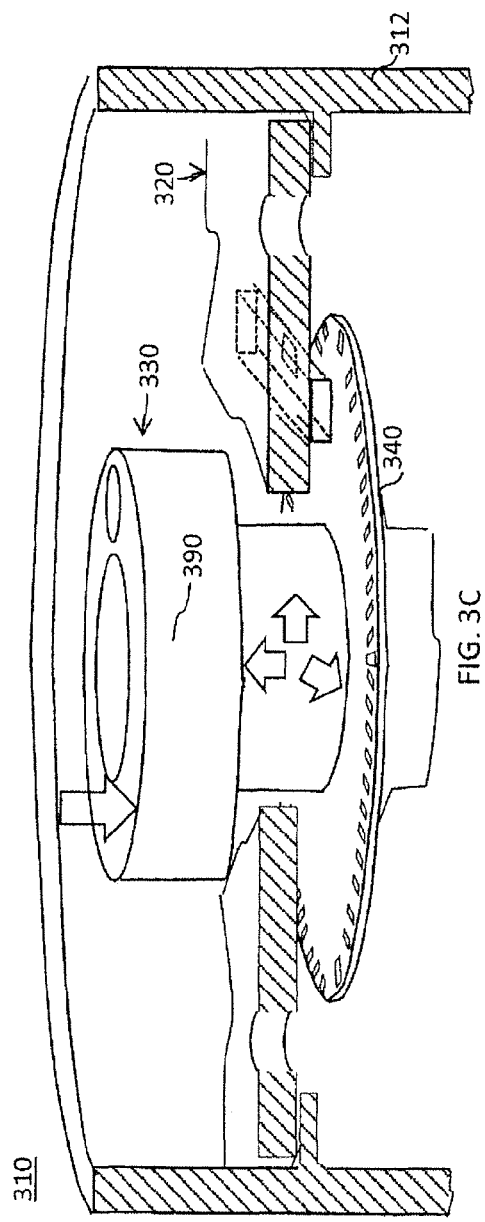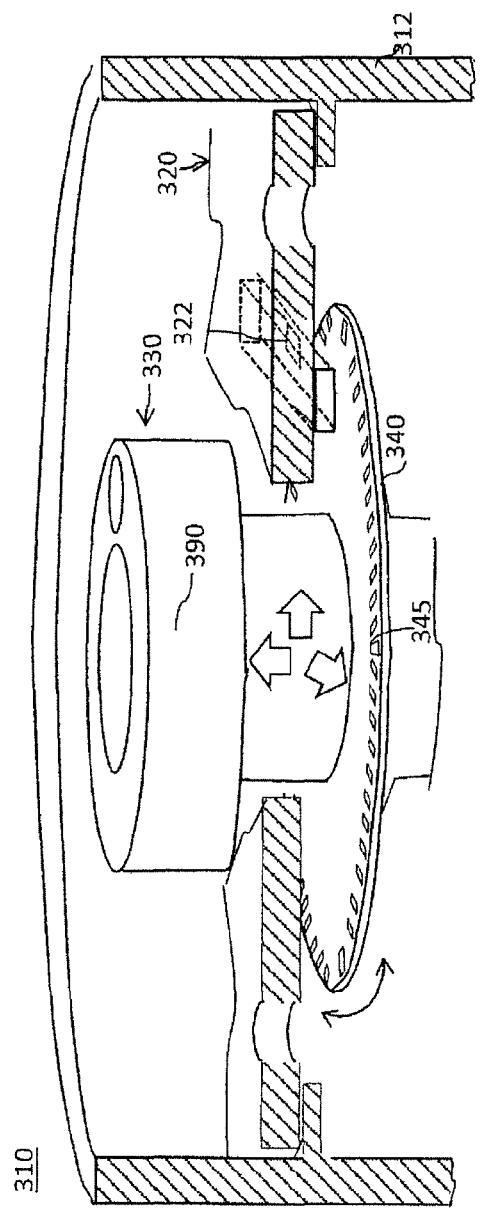

Providing first and second detector projecting members of the encoder alignment structure, and slideably engaging each of the first and second detector projecting members with the detector

FIG. 11B providing a first hub projecting member, first and second detector projecting members of the encoder alignment structure, and slideably engaging each of the first and second detector projecting members with the detector and slideably engaging the first hub projecting members with the hub

FIG. 11C slideably engaging the projecting structure with the printed circuit board of the detector so as to align the index mark of the coding member with the printed circuit board in a second alignment arrangement

FIG. 11D slideably engaging the projecting structure with the detector so as to align the index sensor of the detector with a shaft bore that is coupled to the hub in a predetermined spaced relation

FIG. 11E

SYSTEM AND ASSEMBLY STRUCTURE FOR ALIGNING AN ENCODER

BACKGROUND

Encoders may be configured to measure position, velocity or acceleration of a component in a system. Encoders may be widely used in the field of industrial automation, such as robotics, automatic machines, or other machineries. Encoders may also be commonly used in consumer products, such as printers.

For industrial use, encoders may offer sensing and measuring capability that enable closed-loop feedback in motor control systems. Encoders may also be used in Brushless Direct Current (herein after referred to as "BLDC") motors. A BLDC rotor of the BLDC motor may be made of permanent magnets with a combination of 2, 3, or 4 pole pairs. Commutation of a brushless DC motor may be dependent on the position of the rotor. A feedback device such as an encoder may be essential to be attached to the BLDC motor shaft to indicate the current rotor position to a controller.

While using encoders in these applications provide many advantages, some challenges may still remain. For example, additional configurations or alignment of the encoder may be desired, so as to provide additional desired functionality.

BRIEF DESCRIPTION OF THE DRAWINGS

Illustrative embodiments by way of examples, not by way of limitation, are illustrated in the drawings. Throughout the description and drawings, similar reference numbers may be, but not necessarily, used to identify similar elements. The drawings are for illustrative purpose to assist understanding and may not necessarily be drawn per actual scale.

FIGS. 3A-3D illustrate simplified perspective sectional views of an encoder assembly;

FIGS. 11A-11E illustrate flowcharts showing an encoder assembly method by using an encoder alignment structure.

DETAILED DESCRIPTION

Figure 1:
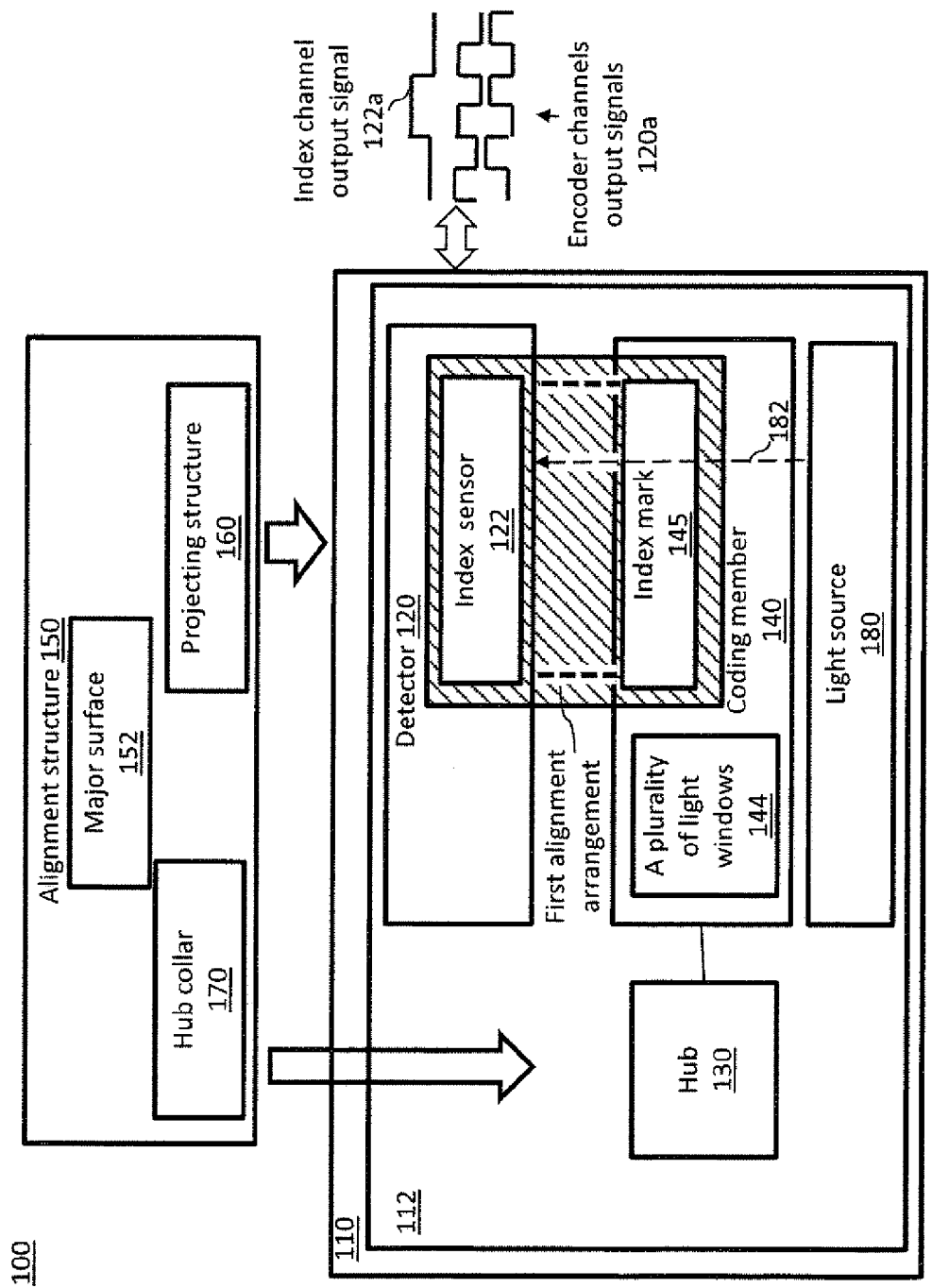
FIG. 1 illustrates a block diagram of an encoder system.

FIG. 1 illustrates a block diagram of an encoder system 100. The encoder system 100 may form a portion of a motor control system. The encoder system 100 may comprise an encoder assembly 110 and an encoder alignment structure 150. The encoder assembly 110 may include at least a detector 120, a hub 130, a housing 112, a light source 180, and a coding member 140. The encoder alignment structure 150 may comprise a projecting structure 160, a hub collar 170, and a major surface 152.

The coding member 140 may be a code wheel or a linear code strip, or any other similar configurations that may be required or desired in a particular application. The coding member 140 may have a plurality of light windows 144. The coding member 140 may further comprise an index mark 145. The index mark 145 may be presented for detection by the detector 120 once for every mechanical rotation of the coding member 140. The index mark 145 may be used to mark a single absolute position of the coding member 140. The index mark 145 may also serves as a reference point to determine a rotary position of the coding member 140.

The light source 180 may be configured to emit light 182 to the plurality of light windows 144 and the index mark 145 of the coding member 140. The light source 180 may be an LED, a laser or other light source capable of emitting light. In one embodiment, the encoder assembly 110 may be a reflective encoder, in which the coding member 140 may reflect the light 182 from the light source 180 to the detector 120. In another embodiment, the encoder assembly 110 may be a transmissive encoder, in which the coding member 140 may transmit the light 182 from the light source 180 to the detector 120.

The detector 120 may be configured to generate encoder channel output signals 120a in response to the reflected or transmitted light 182 from the plurality of light windows 144. The encoder channel output signals 120a may indicate the velocity or direction of the coding member 140. The detector 120 may comprise an index sensor 122. The index sensor 122 may be configured to generate an index channel output signal 122a in response to the reflected or transmitted light 182 from the index mark 145.

The detector 120 may be coupled with the housing 112. The detector 120 may be mounted or secured to the housing 112 such that the index sensor 122 may be secured to a predetermined position with respect to the housing 112. The coding member 140 may be coupled to the hub 130. The hub 130 may be rotatable in the housing 112. The coding member 140 may rotate with the hub 130 when the hub 130 rotates.

The encoder alignment structure 150 may be coupled to the housing 112. The projecting structure 160 may slideably engage the hub 130 in a first alignment arrangement. In the first alignment arrangement, the index mark 145 of the coding member 140 may be aligned with the index sensor 122 of the detector 120. The first alignment arrangement is shown as highlighted using a hatching style in FIG. 1. In one embodiment. By slideably engaging the hub 130 with the projecting structure 160 in the first alignment arrangement, the light 182 emitted from the light source 180 may be reflected or transmitted by the index mark 145 and may be converted to the index channel output signal 122a by the index sensor 122. In another embodiment, the hub collar 170 may extend from the major surface 152 and may be configured with the projecting structure 160 to engage the hub 130 so that the index mark 145 may be aligned to the index sensor 122.

Figure 2:
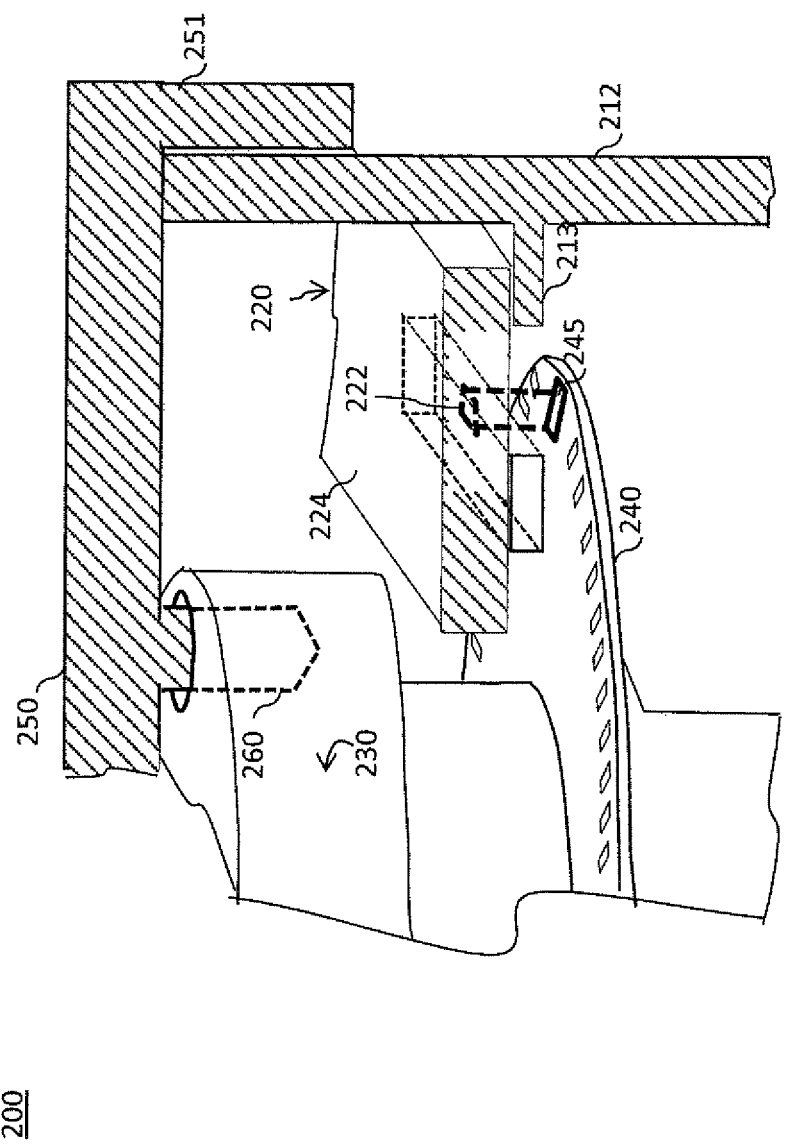
FIG. 2 illustrates a simplified perspective section view of an encoder system.

FIG. 2 illustrates a simplified perspective sectional view of an encoder system 200. The encoder system 200 may comprise a hub 230, an encoder alignment structure 250, a coding member 240, a detector 220, and a housing 212. The coding member 240 may comprise an index mark 245. The detector 220 may comprise a printed circuit board 224 and an index sensor 222. The encoder system 200 may share some or all of the characteristics of the encoder system 100.

The printed circuit board 224 may be coupled with a portion 213 of the housing 212. An extended arm 251 of the encoder alignment structure 250 may engage the housing 212 and a projecting structure 260 of the encoder alignment structure 250 may slideably engage the hub 230 so that the index mark 245 is aligned to the index sensor 222.

FIGS. 3A-3H illustrate an embodiment of an encoder system 300. The encoder system 300 may comprise an encoder assembly 310, and an encoder alignment structure 350. The encoder assembly 310 may comprise a hub 330, a hub ring 390, a detector 320, and a coding member 340. The detector 320 may comprise an index sensor 322. The coding member 340 may comprise an index mark 345.

FIGS. 3A-3D illustrate simplified perspective sectional views of assembly steps for the encoder assembly 310 without the encoder alignment structure 350. The hub 330 and the coding member 340 may be disposed within the housing 312 as illustrated in FIG. 3A. The detector 320 may then be disposed in the housing 312 as illustrated in FIG. 3B. The coding member 340 may be adjusted in a parallel direction along a longitudinal dimension of the hub 330 so that the coding member 340 may be prevented from directly contacting the detector 320. The three directional arrows shown on the hub 330 as illustrated in FIGS. 3B-3D may indicate that the hub 330 may be movable along three different directions during each assembly steps.

Referring now to FIG. 3C, the hub ring 390 may be disposed on the hub 330 to provide access for a screw (not shown). The screw (not shown) may be used to secure a position of the hub 330 after the encoder assembly 310 is assembled to a motor system (not shown). Referring now to FIG. 3D, the index mark 345 of the coding member 340 may not be in alignment to the index sensor 322 of the detector 320. The hub 330 and the coding member 340 may need to be shifted or rotated so that the index mark 345 may be aligned to the index sensor 322.

Figure 3E:
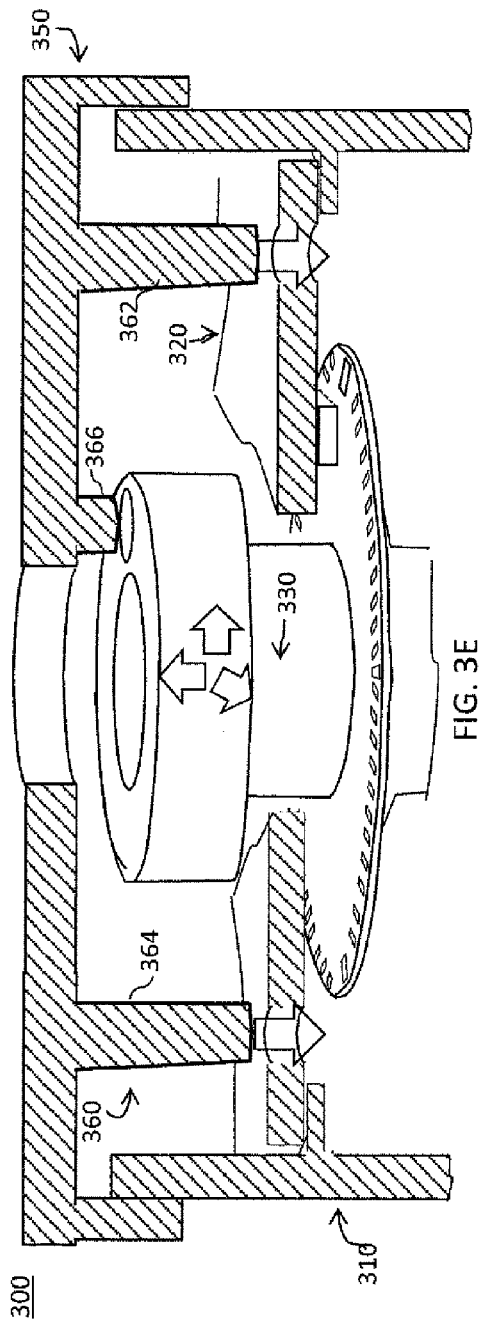
FIGS. 3E-3G illustrate simplified perspective sectional views of an encoder alignment structure slideably engages a hub and a detector in an encoder system.
Figure 3F:
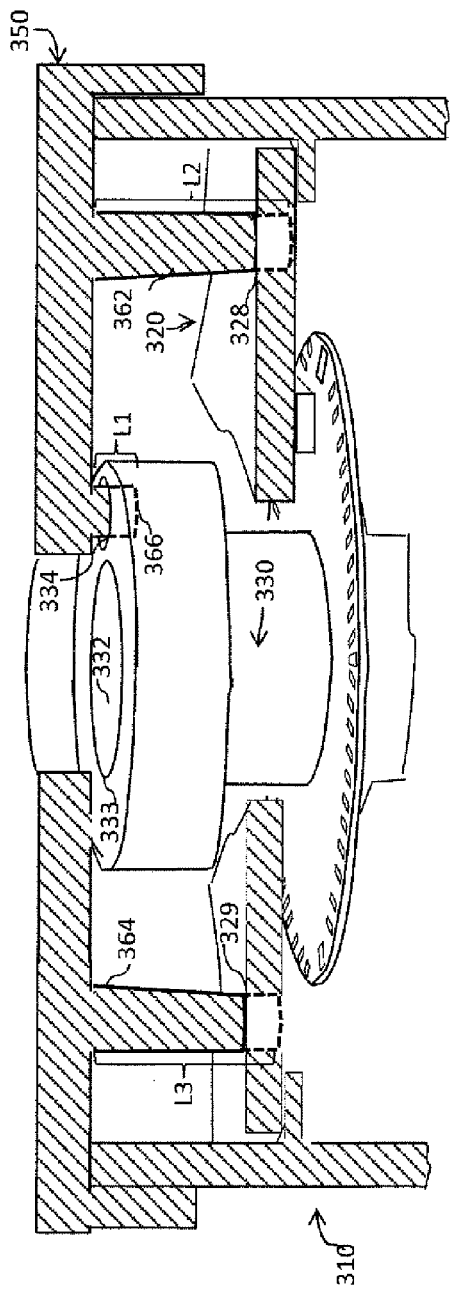

FIGS. 3E-3F illustrate simplified perspective sectional views of the encoder alignment structure 350 slideably engages the hub 330 and the detector 320. The encoder assembly 310 may be configured for receiving the encoder alignment structure 350 having a projecting structure 360. By slideably engaging the projecting structure 360 of the encoder alignment structure 350 with the hub 330, the index sensor 322 may be aligned to the index mark 345 without the need to move or rotate the hub 330 as shown in FIG. 3D. Hence, there may be lesser time required in assembling the encoder assembly 310 to the motor system (not shown).

In one embodiment, the encoder assembly 310 may be a six-channel encoder. In an assembly process of the six-channel encoder to a Brushless DC motor (not shown), it may be necessary to align commutation channels of the encoder assembly 310 with the commutation signals of the Brushless DC motor (not shown). The index channel output signal generated by the index sensor 322 may be used as a reference signal to align the commutation channels of the encoder assembly 310 to the commutation signals of the Brushless DC motor (not shown). By using the encoder alignment structure 350 during the assembly process, the index mark 345 may be aligned to the index sensor 322 immediately and the index channel output signal may be generated to align the commutation channels of the encoder assembly 310 with the commutation channels of Brushless DC motor (not shown). The use of the encoder alignment structure 350 may then eliminate the need to rotate or shift the hub 330 and thereby may reduce the time required to assemble the six-channel encoder to the Brushless DC motor (not shown).

The projecting structure 360 may comprise first and second detector projecting members 362, 364, and each of the first and second detector projecting members 362,364 may slideably engage the detector 320. In another embodiment, the projecting structure 360 may comprise a first hub projecting member 366, and first and second detector projecting members 362, 364. Each of the first and second detector projecting members 362, 364 may slideably engage with the detector 320 and the first hub projecting member may slideably engage with the hub 330.

FIG. 3E illustrates a view before the first hub projecting member 366 slideably engages with the hub 330, and the first and second detector projecting members 362, 364 slideably engage with the detector 320. Before the encoder alignment structure 350 slideably engages the encoder assembly 310, the hub 330 may be movable along three different directions as illustrated by the three directional arrows shown in FIG. 3E. In one embodiment, the first hub projecting member 366 may be arranged proximate to the first detector projecting member 362 but distanced away from the second projecting member 364. In another embodiment, the first hub projecting member 366 may be arranged proximate to the second projecting member 364 but distanced away from the first detector projecting member 362. In yet another embodiment, the first hub projecting member 366 may be arranged proximate to the first and second detector projecting members 362, 364.

FIG. 3F illustrates a view when the first hub projecting member 366 slideably engages with the hub 330 and the first and second detector projecting members 362, 364 slideably engage with the detector 320. In one embodiment, the first hub projecting member 366 may slideably engage the hub 330 prior to the first and second detector projecting members 362, 364 may slideably engage the detector 320. In another embodiment, the first and second detector projecting members 362, 364 may slideably engage the detector 320 first, before the first hub projecting member 366 may slideably engage the hub 330. In yet another embodiment, the first hub projecting member 366 may slideably engage the hub 330 at approximately the same time with the first and second detector projecting members 362, 364 may slideably engage the detector 320. The hub 330 may be prevented from moving or rotating after the encoder alignment structure slideably engages the encoder assembly 310.

Each of the first hub projecting member 366, and first and second detector projecting members 362, 364 may have a respective longitudinal dimension L1, L2, L3 and wherein the respective longitudinal dimension L1, L2, L3 of each of the first hub projecting member 366, and first and second detector projecting members 362, 364 may be substantially parallel to one another. In one embodiment, the longitudinal dimension L1 may be approximately 1-4 mm, and the longitudinal dimension L2, L3 may be approximately 3-10 mm. By having each of the longitudinal dimension L1 within approximately 1-4 mm, and longitudinal dimension L2, L3 within approximately 3-10 mm, the first hub projecting member 366, and first and second projecting members 362, 364 may be sufficiently long enough to engage both the detector 320 and the hub 330 but may be prevented from touching the coding member 340. By preventing the touch on the coding member 340, a risk of contamination of the coding member 340 may be reduced and an accurate output may then be obtained from the encoder assembly 310.

In one embodiment, the longitudinal dimension L1 of the first hub projecting member 366 may be approximately shorter than the longitudinal dimensions L2, L3 of the first and second detector projecting members 362, 364. In another embodiment, the longitudinal dimension L2 of the first detector projecting member 362 may have approximately the same length with the longitudinal dimension L3 of the second detector projecting member 364. In yet another embodiment, the longitudinal dimension L2 of the first detector projecting member 362 may be approximately longer than the longitudinal dimension L3 of the second detector projecting member 364.

Figure 3G:
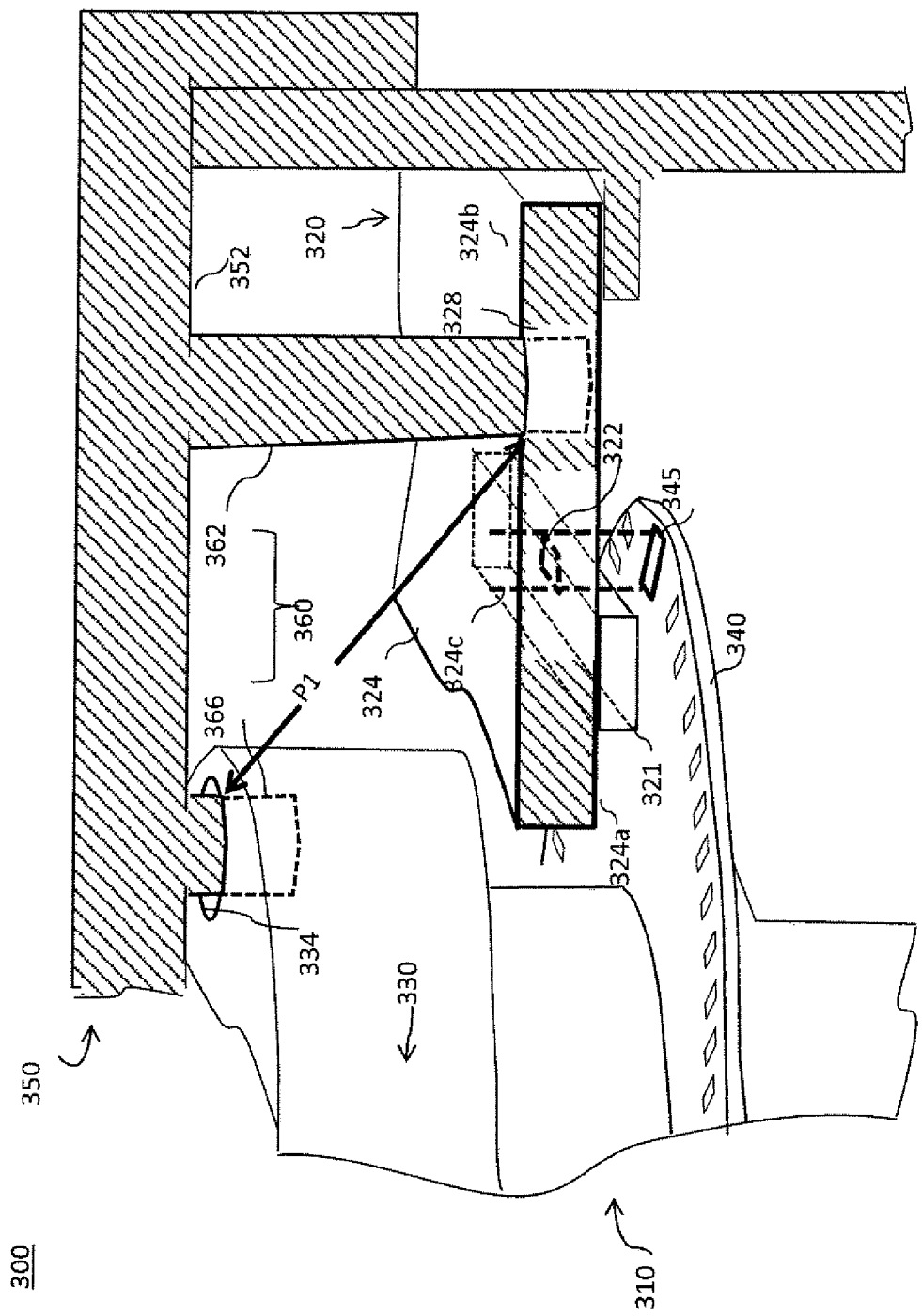

FIG. 3G illustrates a simplified perspective sectional view of the encoder system 300. The detector 320 may further comprise a printed circuit board 324 and a photodetector die 321. The photodetector die 321 may be disposed at a major surface 324a of the printed circuit board 324 facing the coding member 340. The photodetector die 321 may comprise an index sensor 322. The index sensor 322 may be a photo sensor, photo diode or any other type of sensors that may convert light energy to electric energy.

The projecting structure 360 may slideably engage with the printed circuit board 324 of the detector 320 so as to align the index mark 345 of the coding member 340 with the printed circuit board 324 in a second alignment arrangement. The index mark 345 may be aligned with a portion 324c of the printed circuit board 324 where the index sensor 322 may be located in the second alignment arrangement, thereby aligning the index mark 345 indirectly with the index sensor 322. The first detector projecting member 362 of the projecting structure 360 may slideably engage the printed circuit board 324 on a major surface 324b of the printed circuit board 324 that face a major surface 352 of the encoder alignment structure 350 in the second alignment arrangement. The first hub projecting member 366 may slideably engage the hub 330 in the second alignment arrangement.

Referring now to FIGS. 3F and 3G, the detector 320 may comprise a first detector mating structure 328. The hub 330 may comprise a shaft bore 332, and a hub mating structure 334. The shaft bore may comprise a perimeter 333 of the shaft bore 332. The hub mating structure 334 may be disposed about the perimeter 333 of the shaft bore 332. The hub 330 may be coupled to the coding member 340 such that a position of the hub mating structure 334 may correspond to a position of the index mark 345. The hub and first detector mating structures 334, 328 may be configured to slideably receive the projecting structure 360 so as to align the index mark 345 of the coding member 340 with the index sensor 322 of the detector 320 in a first positional arrangement P1 between the hub and first detector mating structures 334, 328. In one embodiment, the first detector mating structure 328 may correspond to a position of the index sensor 322. By slideably engaging the first detector projecting member 362 of the projecting structure 360 with the first detector mating structure 328 and the first hub projecting member 366 with the hub mating structure 334, the hub 330 and/or the coding member 340 may be prevented from rotating, and thereby may allow the index mark 345 to be aligned with the index sensor 322 in the first positional arrangement P1 of the hub and first detector mating structures 334, 328.

Figure 3H:
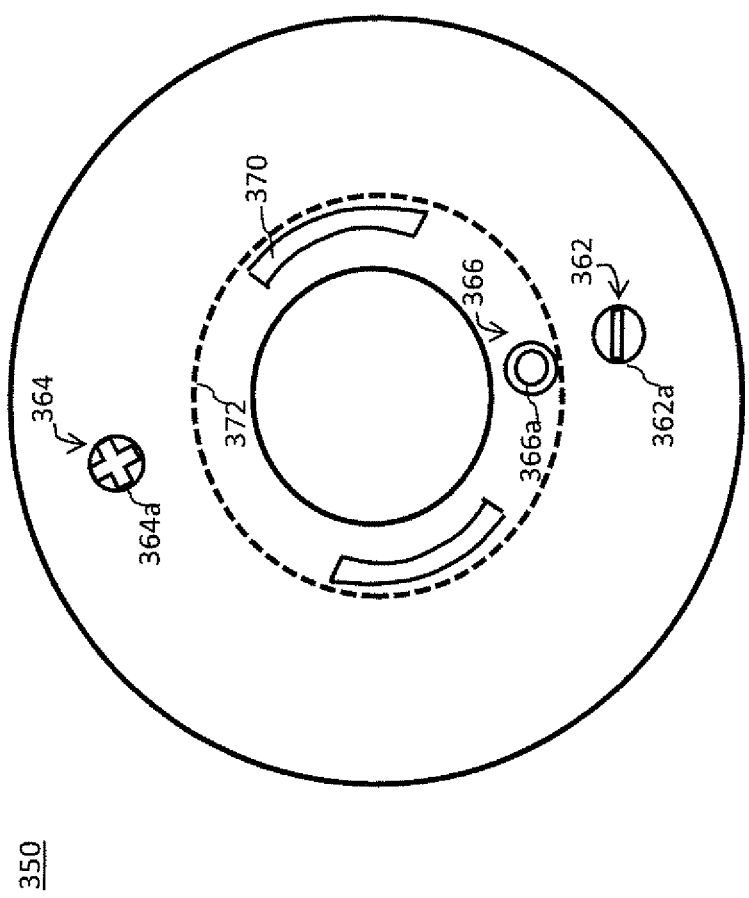
FIG. 3H illustrates a simplified top view of the encoder alignment structure shown in FIGS. 3E-3G.

FIG. 3H illustrates a simplified top view of the encoder alignment structure 350. The encoder alignment structure 350 may further comprise a hub collar 370. The hub collar 370 may comprise a perimeter 372. The first hub projecting member 366, first and second detector projecting members 362, 364 may be arranged about the perimeter 372 of the hub collar 370. In one embodiment, the first and second detector projecting members 362, 364 may be arranged symmetrical with respect to the perimeter 372. In another embodiment, the first and second detector projecting members 362, 364 may be arranged asymmetrical with respect to the perimeter 372.

Referring now to FIGS. 3F-3H, the first and second detector projecting members 362, 364 may have respective first and second extremities 362a, 364a. The second extremity 364a may comprise more contact surfaces to contact the corresponding mating structure 329 of the detector 320 than the first extremity 362a may have to contact the corresponding mating structure 328 of the detector 320. One 364 of the first and second detector projecting members 364, 366 may have an extremity 364a with a substantially "+" shaped cross section to engage the detector 320. Another one 362 of the first and second detector projecting members 362, 364 may have an extremity 362a with a substantially "−" shaped cross section to engage the detector 320. The second extremity 364a of the second projecting member 364 with a substantially "+" shaped cross section may have more contact surfaces to contact with the corresponding mating structure 329 of the detector 320 than the first extremity 362a of the first detector projecting member 362 may have to contact the corresponding mating structure 328 of the detector 320.

The first and second detector projecting members 362, 364 may form interference fit with the corresponding mating structures 328, 329 of the detector 320. By having the first extremity 362a with more contact surfaces than the second extremity 364a, the second extremity 364a may generate lesser friction than the first extremity 362a, and thereby may produce lesser overall resistance when the first and second detector projecting members 362, 364 are slideably engaged to the corresponding mating structures 328, 329. The first hub projecting member 366 may comprise an extremity 366a. The extremity 366a may have more contact surfaces with the corresponding mating structure 334 of the hub 330 than the first and second extremities 362a, 364a may have to contact the corresponding mating structures 328, 329.

In another embodiment, the second extremity 364a may have less contact surfaces to contact the corresponding mating structure 329 than the first extremity 362a to contact the corresponding mating structure 328. In yet another embodiment, the first and second extremities 362a, 364a may have approximately similar number of contact surfaces to contact the corresponding mating structures 328, 329. The cross section shape of the first and second extremities 362a, 364a may be "x" shape, "diamond" shape or any other cross section shapes that may enable the first and second extremities 362a, 364a to form interference fit with the corresponding mating structures 328,329.

Figure 4:
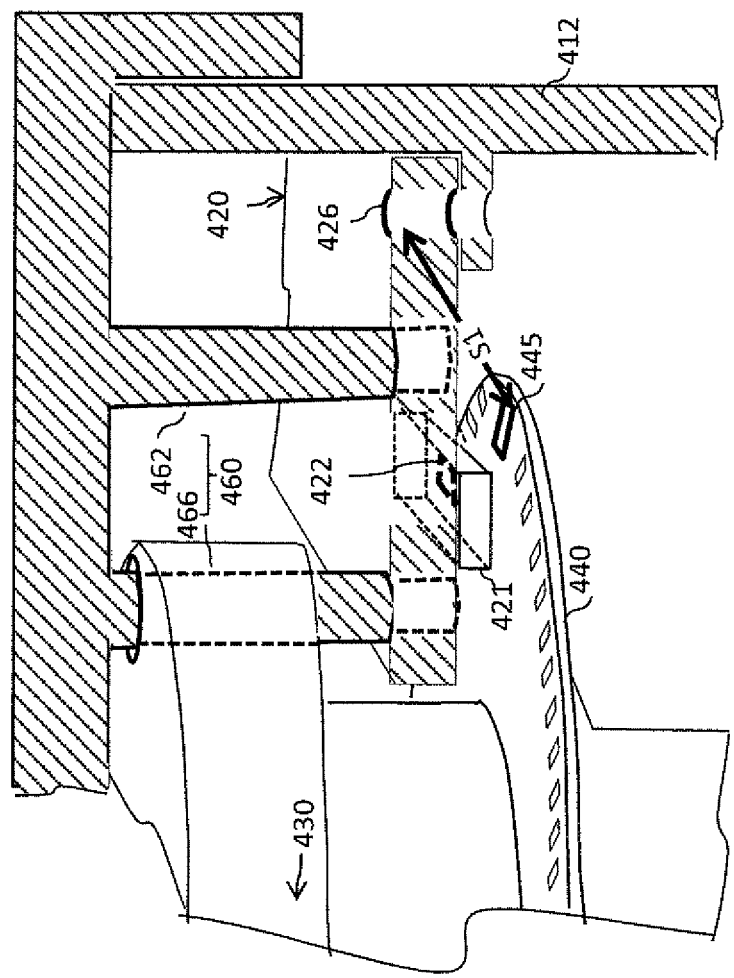
FIGS. 4-8 illustrate simplified perspective sectional views of various embodiments of an encoder system.

FIG. 4 illustrates a simplified perspective sectional view of an embodiment of an encoder system 400. The encoder system 400 may comprise a hub 430, a projecting structure 460, a detector 420, a coding member 440, and a housing 412. The detector 420 may comprise a detector die 421. The coding member 440 may comprise an index mark 445. The encoder system 400 may share some or all of the characteristics of the encoder systems 100, 200 or 300 discussed previously herein.

The detector 420 may comprise a mounting bore 426. The detector 420 may be coupled to the housing 412 through the mounting bore 426. The projecting structure 460 may slideably engage with the detector 420 so as to align the index mark 445 of the coding member 440 with the mounting bore 426 in a first predetermined spaced relation S1. The first predetermined spaced relation S1 may be a spaced relation between the index mark 445 and the mounting bore 426. In the first predetermined spaced relation S1, a position of the index mark 445 may be ascertained when a position of the mounting bore 426 is determined. In one embodiment, the first predetermined spaced relation S1 may be approximately 5-8 mm.

Referring to FIG. 4, the mounting bore 426 may be in the first predetermined spaced relation S1 with the index mark 445. By determining the position of the mounting bore 426 with respect to the index sensor 422, the position of the index mark 445 with respect to the index sensor 422 can be ascertained. The index sensor 422 may be indirectly aligned with the index mark 445 because of the first predetermined spaced relation S1 between the mounting bore 426 and the index mark 445. As a result, the time required to assemble the encoder system 400 to a motor system (not shown) may be reduced as discussed previously in earlier paragraphs.

The projecting structure 460 may comprise a hub projecting member 466 and a detector projecting member 462. The hub projecting member 466 may be arranged proximate to the detector projecting member 462 but distanced away from the mounting bore 426. The hub projecting member 466 may be sufficiently long enough to slideably engage the hub 430 and the detector 420. The detector projecting member 462 may slideably engage the detector 420 so as to align the index mark 445 to the mounting bore 426 that corresponds to the position of the detector die 421. The detector die 421 may be configured to generate an output signal (not shown) that corresponds to the index mark 445.

Figure 5:
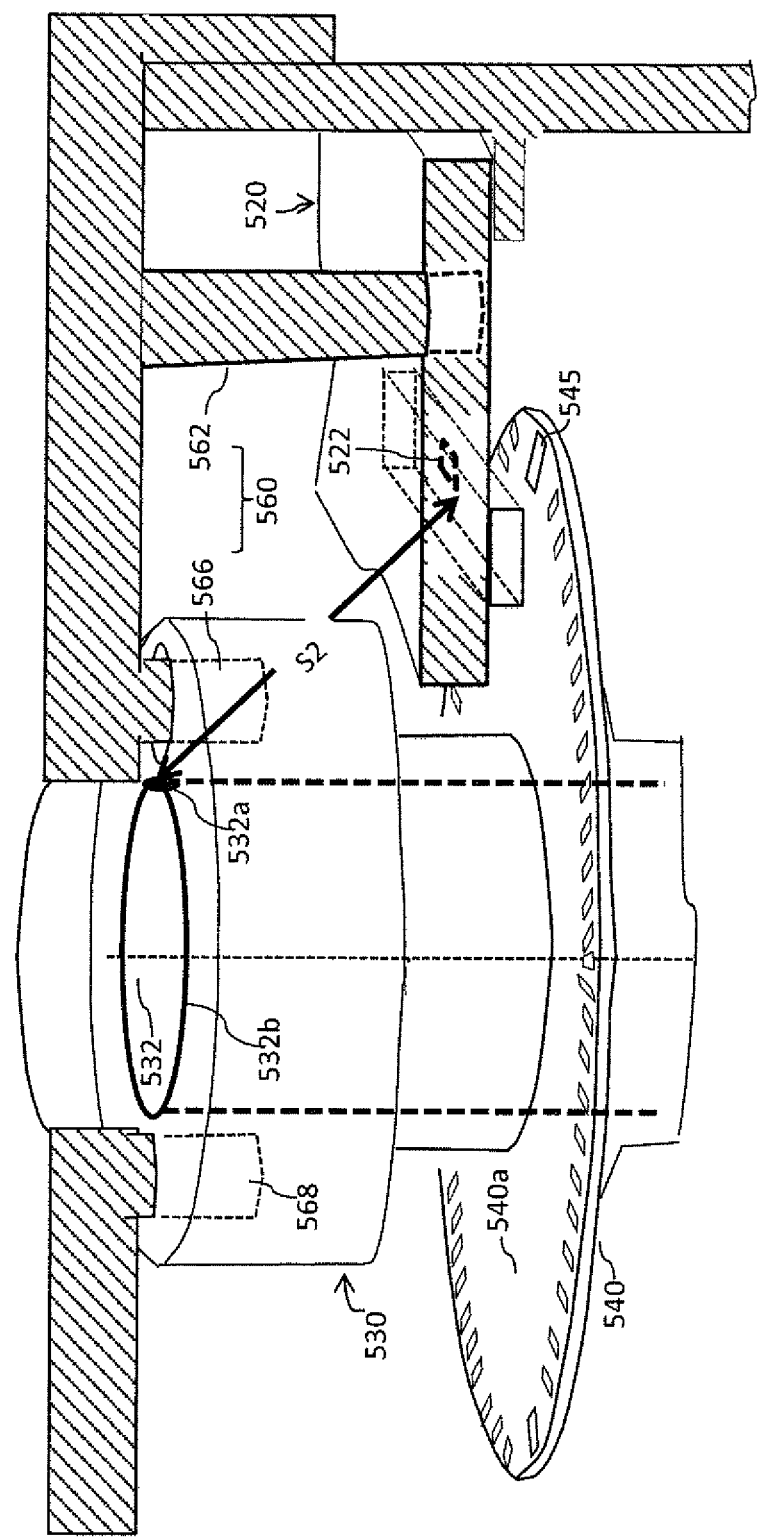

FIG. 5 illustrates a simplified perspective sectional view of an embodiment of an encoder system 500. The encoder system 500 may comprise a coding member 540, an index mark 545 of the coding member 540, a detector 520, an index sensor 522 of the detector 520, a projecting structure 560, and a hub 530. The encoder system 500 may share some of all the characteristics of the encoder systems 100, 200 or 300. The hub 530 may comprise a shaft bore 532 configured to receive a shaft (not shown) and to couple the shaft (not shown) with the hub 530. The projecting structure 560 may slideably engage the detector 520 so as to align the index sensor 522 of the detector 520 with the shaft bore 532 in a second predetermined spaced relation S2.

The second predetermined spaced relation S2 may be a spaced relation between the shaft bore 532 and the index sensor 522. In the second predetermined spaced relation S2, a position of the index sensor 522 may be ascertained by determining a position of the shaft bore 532. For example, in one embodiment, the shaft bore 532 may comprise a marking 532a along a perimeter 532b of the shaft bore 532. The marking 532a may be used to denote the position of the shaft bore 532 that correspond to the position of the index sensor 522.

Referring to FIG. 5, the shaft bore 532 may be in the second predetermined spaced relation S2 with the index sensor 522. By determining the position of the marking 532a of the shaft bore 532 with respect to the index mark 545, the position of the index sensor 522 with respect to the index mark 545 may be ascertained. The index mark 545 may then be indirectly aligned with the index sensor 522 since the shaft bore 532 is in the second predetermined spaced relation S2 with the index sensor 522. As a result, the time required to assemble the encoder system 500 to a motor system (not shown) may be reduced as discussed previously in earlier paragraphs.

The projecting structure 560 may comprise a detector projecting member 562, a first hub projecting member 566, and a second hub projecting member 568. The detector projecting member 562 may slideably engage the detector 520 and the first and second hub projecting members 566, 568 may slideably engage the hub 530 so as to align the index sensor 522 and the shaft bore 532 with the index mark 545 in the second predetermined spaced relation S2.

Figure 6:
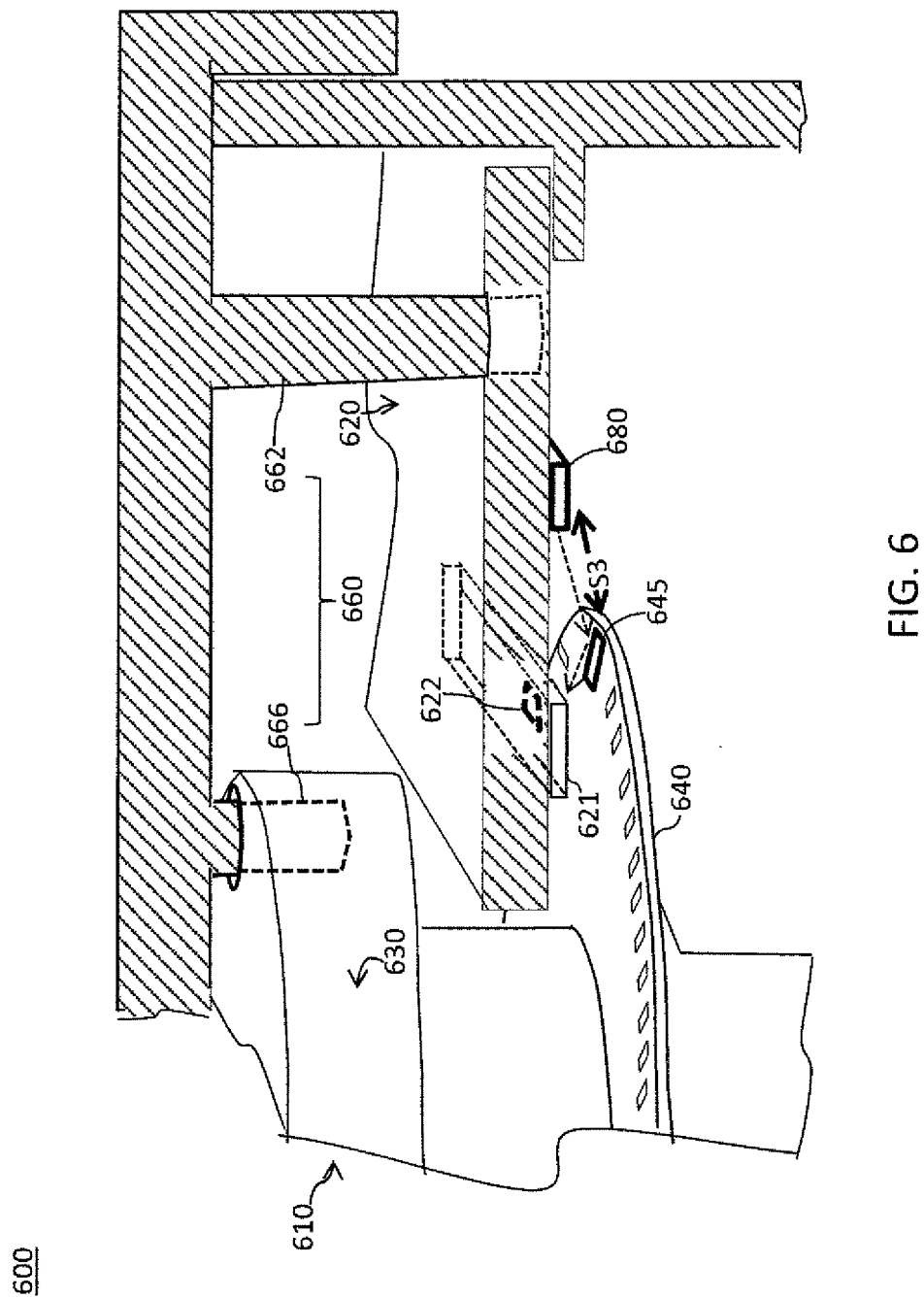

FIG. 6 illustrates a simplified perspective sectional view of an embodiment of an encoder system 600. The encoder system 600 may comprise an encoder assembly 610 and a projecting structure 660. The encoder assembly 610 may comprise a coding member 640, an index mark 645 of the coding member 640, a detector 620, a detector die 621 of the detector 620, a hub 630, and a light source 680. The detector die 621 may comprise an index sensor 622. The encoder system 600 may share some or all of the characteristics of the encoder systems 100, 200 or 300 discussed previously herein.

The light source 680 may be optically coupled with the detector die 621. The light source 680 may be configured to emit light that is reflected by the coding member 640 to the detector die 621. The projecting structure 660 may slideably engage the hub 630 so as to align the index mark 645 of the coding member 640 with the light source 680 in a third predetermined spaced relation S3. The third predetermined spaced relation S3 may refer to a spaced relation between the light source 680 and the index mark 645. In the third predetermined spaced relation S3, a position of the index mark 645 may be ascertained by determining a position of the light source 680.

Referring to FIG. 6, the light source 680 may be in the third predetermined spaced relation S3 with the index mark 645. By determining the position of the light source 680 with respect to the index sensor 622, the position of the index mark 645 with respect to the index sensor 622 may be ascertained. The index sensor 622 may be indirectly aligned with the index mark 645 since the light source 680 is in the third predetermined spaced relation S3 with the index mark 645. As a result, the time required to assemble the encoder system 600 to a motor system (not shown) may be reduced as discussed previously in earlier paragraphs.

The projecting structure 660 may comprise a detector projecting member 662 to slideably engage the detector 620 and a hub projecting member 666 to slideably engage the hub 630. In the embodiment shown in FIG. 6, the detector projecting member 662 may be arranged proximate to the light source 680 but distanced away from the detector die 621. In another embodiment, the detector projecting member 662 may be arranged proximate to the detector die 621 but distanced away from the light source 680.

Figure 7:
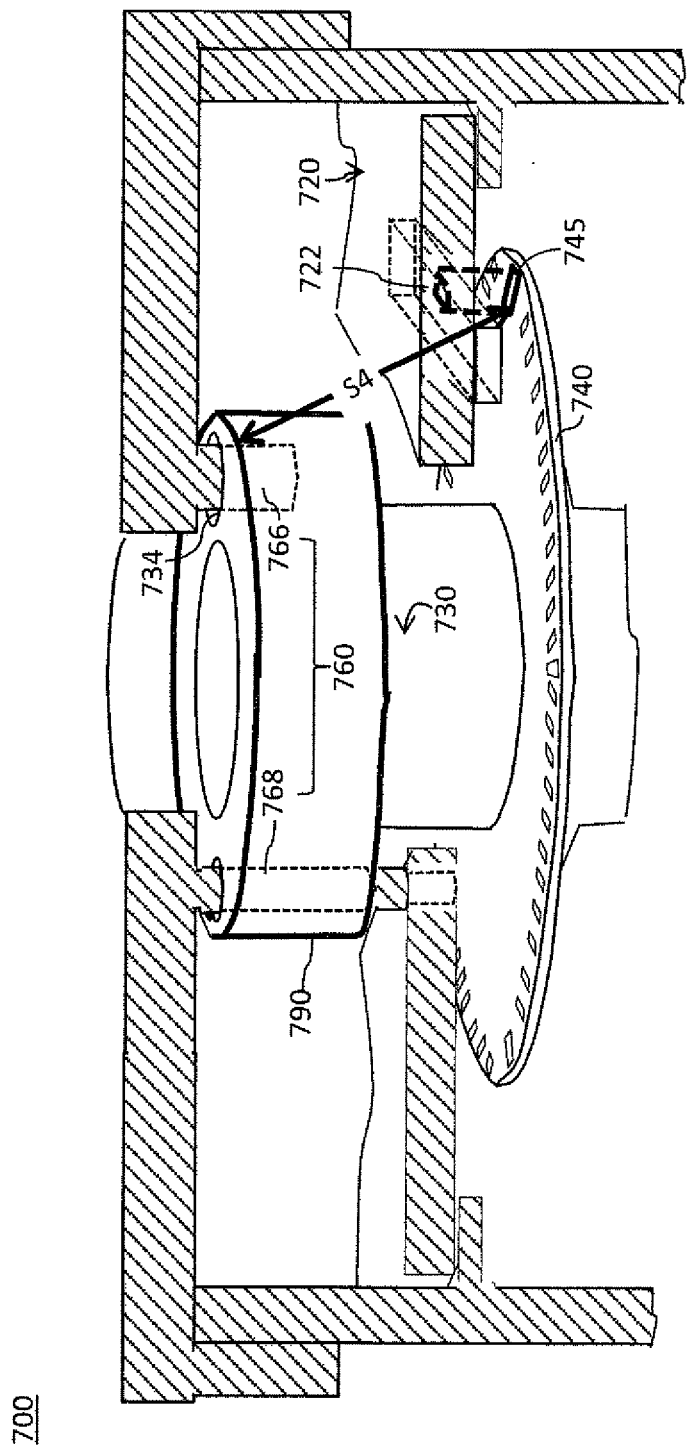

FIG. 7 illustrates a simplified perspective sectional view of an embodiment of an encoder system 700. The encoder system 700 may comprise a hub 730, a coding member 740, an index mark 745 of the coding member 740, a projecting structure 760, a detector 720, and an index sensor 722 of the detector 720. The encoder system 700 may share some or all of the characteristics of the encoder systems 100, 200, or 300.

The hub 730 may comprise a hub ring 790 formed at least partially surrounding the hub 730. The projecting structure 760 may slideably engage the hub ring 790 so that the index sensor 722 of the detector 720 may be aligned to the index mark 745 in a fourth predetermined spaced relation S4 between the index mark 745 and the hub ring 790.

The fourth predetermined spaced relation S4 may be a spaced relation between the index mark 745 and the hub ring 790. In the fourth predetermined spaced relation S4, a position of the index mark 745 may be determined by ascertaining a position of the hub ring 790. In one embodiment, the hub ring 790 may comprise a corresponding mating structure 734 to slideably receive the projecting structure 760. The corresponding mating structure 734 of the hub ring 790 may be used to indicate a position of the hub ring 790 that corresponds to the position of the index mark 745 in the fourth predetermined spaced relation S4.

Referring to FIG. 7, the index mark 745 may be in the fourth predetermined spaced relation S4 with the hub ring 790. By determining the position of the corresponding mating structure 734 of the hub ring 790 with respect to the index sensor 722, the position of the index mark 745 with respect to the index sensor 722 may be ascertained. The index sensor 722 may be indirectly aligned to the index mark 745 since the index mark is in the fourth predetermined spaced relation S4 with the hub ring 790. As a result, the time required to assemble the encoder system 700 to a motor system (not shown) may be reduced as per the explanation discussed previously in earlier paragraphs.

The projecting structure 760 may comprise first and second hub projecting members 766, 768. The first hub projecting member 766 may engage the hub ring 790 and the second hub projecting member 768 may engage the hub ring 790 and the detector 720. In one embodiment, the index sensor 722 may be arranged proximate to the first hub projecting member 766 but distanced away from the second hub projecting member 768. In another embodiment, the index sensor 722 may be arranged proximate to the second hub projecting member 768 but distanced away from the first hub projecting member 766.

Figure 8:
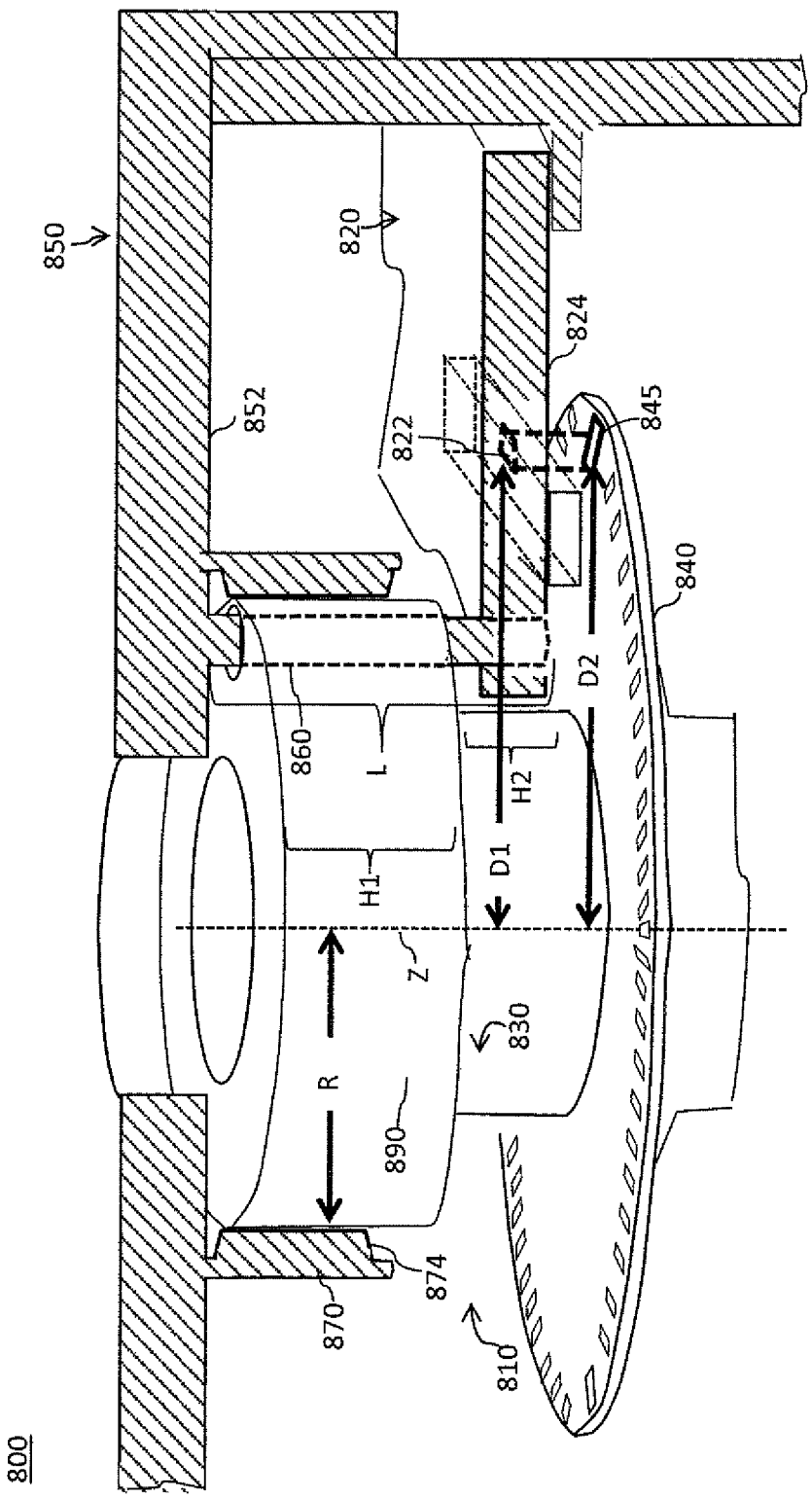

FIG. 8 illustrates a simplified perspective sectional view of an encoder system 800 having an encoder alignment structure 850 with an encoder assembly 810. The encoder assembly 810 may comprise a hub 830, a coding member 840 coupled to the hub 830, an index mark 845 of the coding member 840, and a detector 820, and an index sensor 822 of the detector 820. The encoder alignment structure 850 may comprise a major surface 852, a hub collar 870, and a projecting structure 860. The encoder alignment structure 850 may share some or all of the characteristics of the encoder alignment structures 150, 250, or 350 discussed previously herein. In one embodiment, the encoder alignment structure 850 may be integrally formed. In another embodiment, the encoder alignment structure 850 may be formed separately from one another.

The hub collar 870 may be arranged extending from the major surface 852 of the encoder alignment structure 850 to slideably engage the hub 830. The projecting structure 860 may have a longitudinal dimension L extending outwardly from the major surface 852 of the encoder alignment structure 850. The longitudinal dimension L may be sufficiently long for slideably engaging the detector 820 and the hub 830 when the major surface 852 is adjacent to the hub 830, so as to substantially align the index mark 845 of the coding member 840 with the index sensor 822 of the detector 820.

In the embodiment shown in FIG. 8, the projecting structure 860 may substantially extend through the hub 830 to slideably engage the detector 820. In another embodiment, the projecting structure 860 may be arranged proximate to the detector 820 but distanced away from the coding member 840. The hub 830 may comprise a hub ring 890. The hub ring 890 may have a longitudinal dimension H1. The detector 820 may be located at a distance H2 from the hub ring 890.

In one embodiment, the longitudinal dimension H1 of the hub ring 890 may be approximately 3-5 mm. The distance H2 may be approximately 0.5-5 mm. The longitudinal dimension L may be approximately 3.5-10 mm. By arranging the projecting structure 860 with the longitudinal dimension L of approximately 3.5-10 mm to be distanced away from the coding member 840, the projecting structure 860 may be sufficiently long enough to engage both the detector 820 and the hub 830 but may be prevented from touching the coding member 840. By preventing the touch on the coding member 840, a risk of contamination of the coding member 840 may be reduced and an accurate output may then be obtained from the encoder assembly 810.

The hub collar 870 may comprise a rib structure 874. The rib structure 874 may protrude inwardly from the hub collar 870. The rib structure 874 may engage the hub 830 in a predefined radial position R such that the coding member 840 and the detector 820 are coaxially aligned. The hub 830 may be rotatable around an axis of rotation Z. The axis of rotation Z of the hub 830 may coincide with an axis of rotation of a motor shaft (not shown) that is measured by the encoder assembly 810. The index sensor 822 of the detector 820 may be arranged at a distance D1 in a direction perpendicular to the axis of rotation Z. The index mark 845 of the coding member 840 may be arranged at a distance D2 in a direction perpendicular to the axis of rotation Z. In one embodiment, the distance D1 of the index sensor 822 may be approximately equal to the distance D2 of the index mark 845. Since the distance D1, D2 are approximately equal with respect to the axis of rotation Z, the index sensor 822 may generate a more accurate output signal that corresponds to the index mark 845 in measuring a movement of the motor shaft (not shown) around the axis of rotation Z.

Figure 9A:
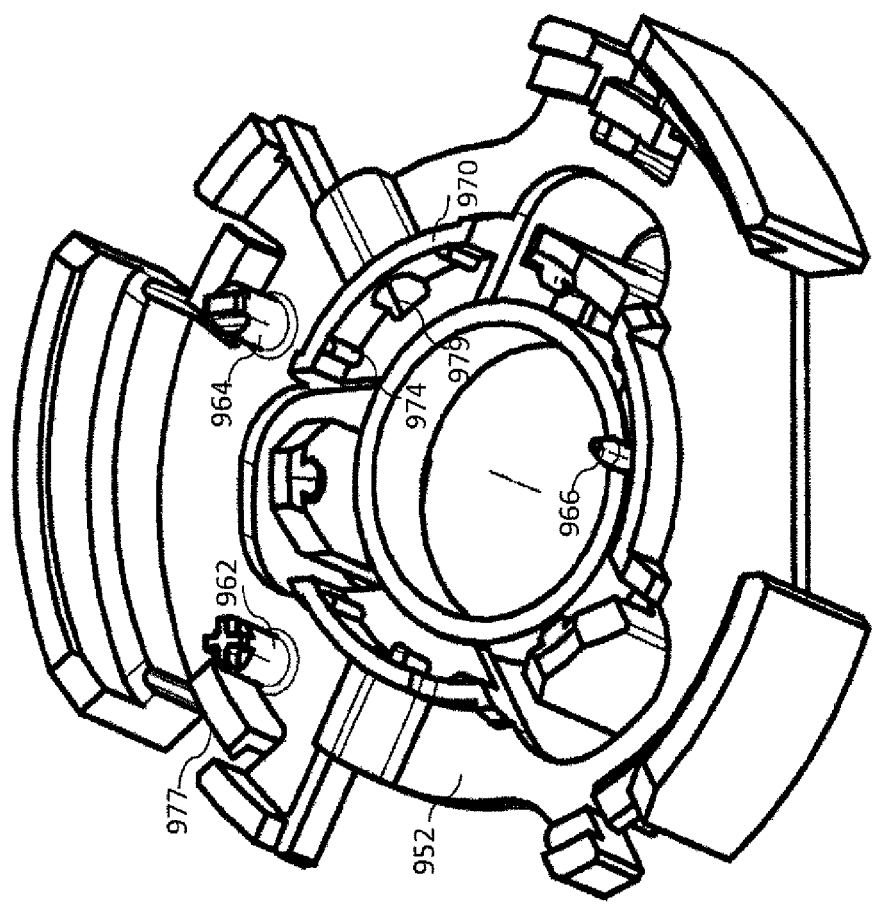
FIG. 9A illustrates a perspective view of an encoder alignment structure.
Figure 9C:
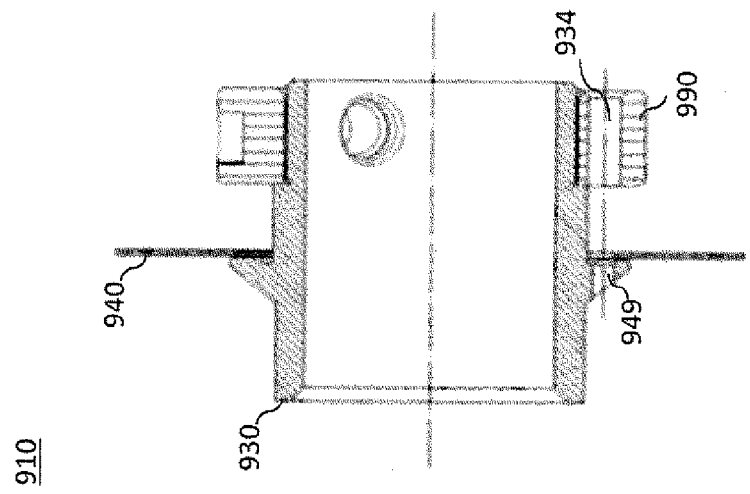
FIG. 9C illustrates sectional view of the encoder assembly in FIG. 9B.
Figure 9B:
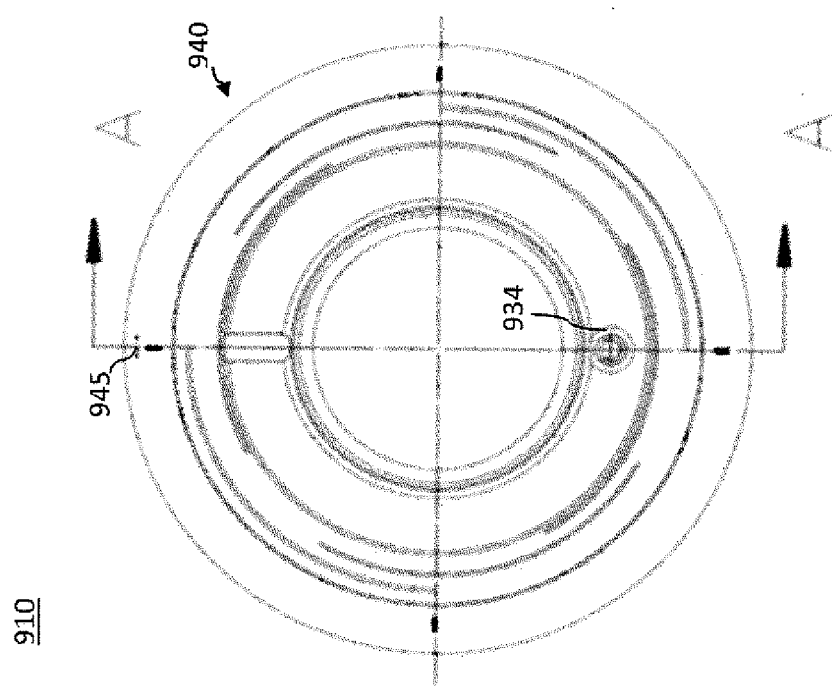
FIG. 9B illustrates a top view of an encoder assembly.

FIGS. 9A-9C illustrate an embodiment of an encoder alignment structure 950 and an encoder assembly 910. The encoder alignment structure 950 may comprise a major surface 952, a hub projecting member 966, first and second detector projecting members 962, 964, a hub collar 970, a rib structure 974 of the hub collar 970, and a latch structure 977. The encoder assembly 910 may comprise a hub 930, a coding member 940, a hub ring 990, a hub mating structure 934 of the hub ring 990, an index mark 945 of the coding member 940. The encoder alignment structure 950 and the encoder assembly 910 may share some or all of the characteristics of the encoder alignment structure 150, 250 or 350 and the encoder assembly 110 or 310.

FIG. 9A illustrates a perspective view of the encoder alignment structure 950. The latch structure 977 may be configured to couple the encoder alignment structure 950 to a housing (not shown) of the encoder assembly 910. FIG. 9C illustrates a cross section view of the encoder assembly 910 taken from the line AA in FIG. 9B. Referring to FIGS. 9A-9C, the encoder alignment structure 950 may comprise a screw bore 979. The screw bore 979 may be configured to provide a passage for a screw (not shown) for tightening and/or affixing the hub 930 to a motor shaft (not shown).

The hub 930 may comprise a hub shoulder structure 949 to couple the coding member 940 to the hub 930. The hub mating structure 934 may be configured to indicate the position of the index mark 945 by aligning the hub mating structure 934 to the hub shoulder structure 949.

Figure 10:
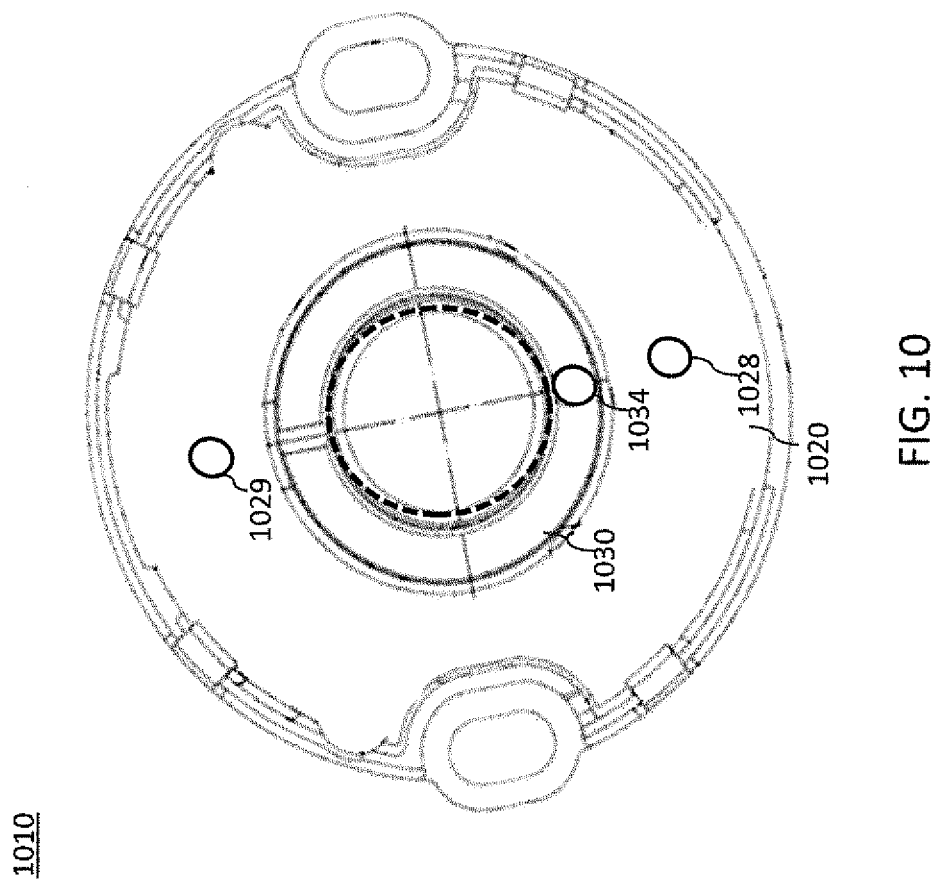
FIG. 10 illustrates a simplified top view of an encoder assembly.

FIG. 10 illustrates a simplified top view of an encoder assembly 1010. The encoder assembly 1010 may comprise a detector 1020, a hub 1030, a hub mating structure 1034, first and second detector mating structures 1028, 1029. The encoder assembly 1010 may share some or all of the characteristics of the encoder assembly 110 or 310. In the embodiment illustrated in FIG. 10, the first and second detector mating structures 1028, 1029 may be substantially symmetrical with respect to the hub 1030. In another embodiment, the first and second detector mating structures 1028, 1029 may be substantially asymmetrical with respect to the hub 1030.

Figure 11A:
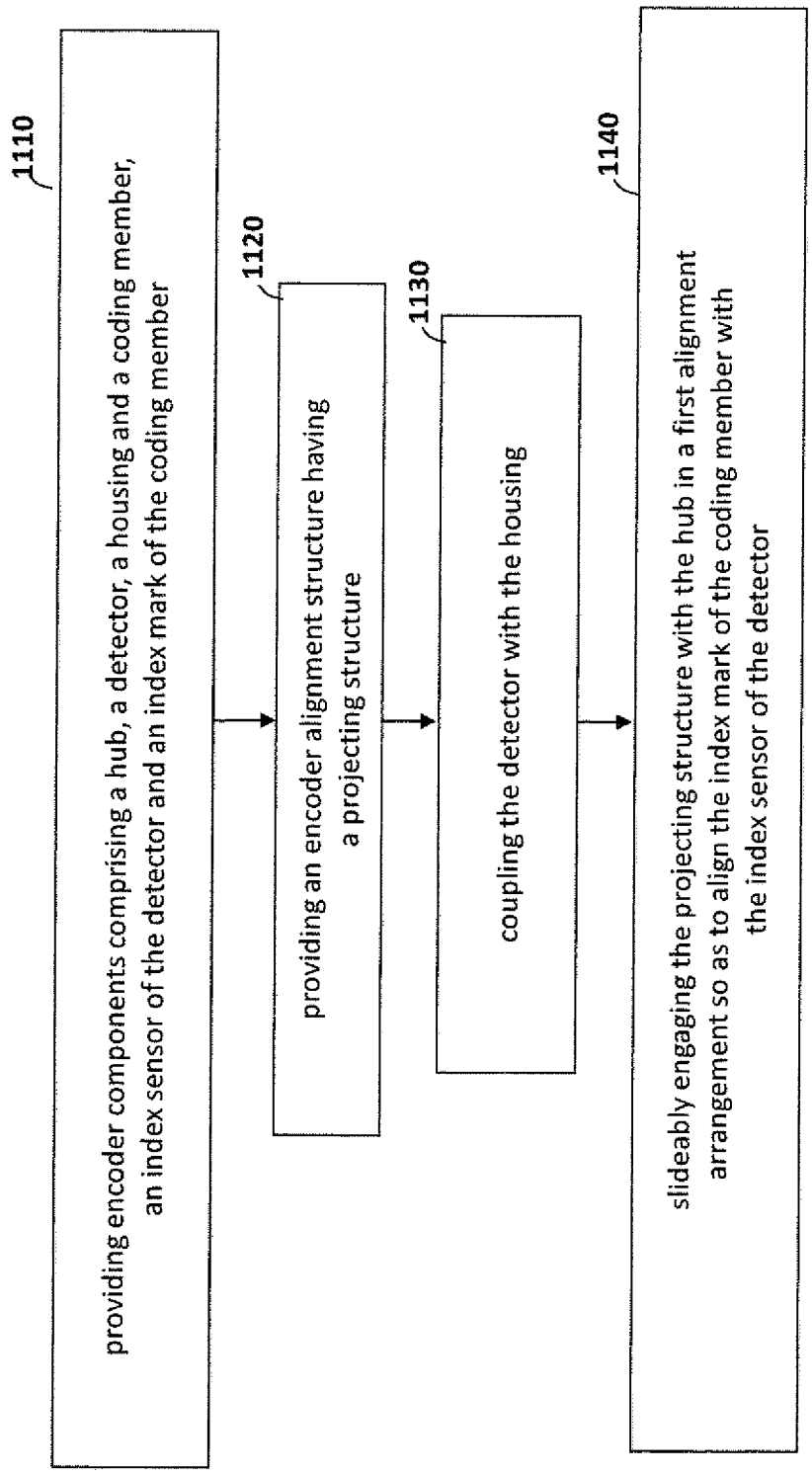

FIGS. 11A-11E illustrate flowcharts showing an encoder assembly method by using an encoder alignment structure. Referring to FIG. 11A, encoder components comprising a hub, a detector, a housing and a coding member, an index sensor of the detector and an index mark of the coding member may be provided in Step 1110. In Step 1120, an encoder alignment structure comprising a projecting structure may be provided. In Step 1130, the housing may be coupled with the detector. In Step 1140, the projecting structure may be slideably engaged with the hub in a first alignment arrangement so as to align the index mark of the coding member with the index sensor of the detector. The encoder assembly method may then proceed to an optional method illustrated in FIG. 11B. In Step 1150, first and second detector projecting members of the encoder alignment structure may be provided, and each of the first and second projecting members may be slideably engaged with the detector.

Alternatively, the encoder assembly method may proceed from Step 1150 to other optional steps; Step 1160 as illustrated in FIG. 11C, or Step 1170 as illustrated in FIG. 11D, or Step 1180 as illustrated in FIG. 11E. In Step 1160, a first hub projecting member, first and second detector projecting members of the encoder alignment structure may be provided. Each of the first and second detector projecting members may be slideably engaged with the detector and the first hub projecting member may be slideably engaged with the hub. In Step 1170, a printed circuit board of the detector may be provided and the projecting structure may be slideably engaged with the printed circuit board of the detector so as to align the index mark of the coding member with the printed circuit board in a second alignment arrangement. In Step 1180, a shaft bore for receiving a shaft and coupling the shaft to the hub may be provided. The projecting structure may be slideably engaged with the detector so as to align the index sensor of the detector with the shaft bore in a predetermined spaced relation.

Different aspects, embodiments or implementations may, but need not, yield one or more of the advantages. For example, by utilizing at least one projecting member to slideably engage with the detector and another projecting member to slideably engage with the hub may provide more restriction on a movement of the hub, and thereby may provide better accuracy in aligning the index mark to the index sensor. Another example is by having one detector projecting member having an extremity with less contact surfaces with the corresponding mating structure than another detector projecting member, may result in less friction between the extremity of the projecting member and the corresponding mating structure and thereby providing less resistance when slideably engaging the detector projecting members to the detector.

Although specific embodiments of the invention have been described and illustrated herein above, the invention should not be limited to any specific forms or arrangements of parts so described and illustrated. For example, the encoder assembly described above may be a transmissive encoder, a reflective encoder, an absolute encoder, an incremental encoder or any other types of encoder that utilize an index mark and index sensor. Similarly, although certain orientation terms such as "proximate", and "distanced away", were used, the scope should not be limited to such orientation. The scope of the invention is to be defined by the claims.

What is claimed is:

1. An encoder system, comprising:
   an encoder assembly including at least a detector, a hub, a housing, an index sensor of the detector, and a coding member having an index mark; and
   an encoder alignment structure having a projecting structure,
   wherein the detector is coupled with the housing, and
   wherein the projecting structure extends through the hub to slideably engage the detector and the hub so as to align the index mark of the coding member with the index sensor of the detector in an alignment arrangement.

2. The encoder system of claim 1, wherein the projecting structure further comprises first and second detector projecting members,
   and wherein each of the first and second detector projecting members slideably engages the detector.

3. The encoder system of claim 1, wherein the projecting structure further comprises a first hub projecting member, and first and second detector projecting members and wherein each of the first and second detector projecting members slideably engages with the detector and the first hub projecting member slideably engages with the hub.

4. The encoder system of claim 1, wherein the projecting structure further comprises a first hub projecting member, and first and second detector projecting members, wherein each of the first hub projecting member, and first and second detector projecting members have a respective longitudinal dimension and wherein the respective longitudinal dimension of each of the first hub projecting member, and first and second detector projecting members are substantially parallel to one another.

5. The encoder system of claim 1, wherein the detector further comprises a printed circuit board and wherein the projecting structure slideably engages with the printed circuit board of the detector so as to align the index mark of the coding member with the printed circuit board.

6. The encoder system of claim 1, wherein:
   the encoder alignment structure further comprises a hub collar having a perimeter;
   the projecting structure further comprises a first hub projecting member, first and second detector projecting members; and
   the first hub projecting member, and first and second detector projecting members are arranged about the perimeter of the hub collar.

7. The encoder system of claim 1, wherein the detector further comprises a mounting bore and wherein the projecting structure slideably engages with the detector so as to further align the index mark of the coding member with the mounting bore in a first predetermined spaced relation.

8. The encoder system of claim 1, wherein the hub further comprises a shaft bore configured to receive a shaft and to couple the shaft with the hub, and wherein the projecting structure slideably engages the detector so as to further align the index sensor of the detector with the shaft bore.

9. The encoder system of claim 1, wherein:
   the detector further comprises a detector die;
   the encoder assembly further comprises a light source optically coupled with the detector die; and
   the projecting structure slideably engages the hub so as to align the index mark of the coding member with the light source.

10. The encoder system of claim 1, wherein the hub comprises a hub ring formed at least partially surrounding the hub, wherein the projecting structure slideably engages the hub ring.

11. The encoder system of claim 6, wherein the first and second detector projecting members have respective first and second extremities, wherein the second extremity comprises more contact surfaces to contact a corresponding mating structure of the detector than the first extremity has to contact the corresponding mating structure of the detector.

12. The encoder system of claim 6, wherein one of the first and second detector projecting members has an extremity with a substantially "+" shaped cross section to engage the detector.

13. An encoder alignment structure for aligning a hub, a coding member coupled to the hub and having an index mark, and a detector having an index sensor, comprising:
   a major surface of the encoder alignment structure;
   a hub collar extending from the major surface of the encoder alignment structure to slideably engage the hub; and
   a projecting structure having a longitudinal dimension extending outwardly from the major surface of the encoder alignment structure, wherein the longitudinal dimension is sufficiently long for extending through the hub to slideably engage the detector and the hub when the major surface is adjacent to the hub, so as to substantially align the index mark of the coding member with the index sensor of the detector.

14. The encoder alignment structure of claim 13, wherein the hub collar comprises a rib structure protruding inwardly from the hub collar, wherein the rib structure engages the hub in a predefined radial position such that the coding member and the detector are coaxially aligned.

15. The encoder alignment structure of claim 13, wherein the encoder alignment structure is integrally formed.

16. The encoder alignment structure of claim 13, wherein the projecting structure is arranged proximate to the detector but distanced away from the coding member.

17. The encoder alignment structure of claim 13, wherein the detector further comprises a detector die.

18. An encoder assembly configured for receiving an alignment structure having a projecting structure, comprising:
   a detector, the detector having an index sensor and a first detector mating structure;
   a coding member, the coding member having an index mark; and
   a hub, the hub having a shaft bore, a hub mating structure, and a perimeter of the shaft bore;
   wherein the hub mating structure is disposed about the perimeter of the shaft bore;
   wherein the hub is coupled to the coding member such that a position of the hub mating structure corresponds to a position of the index mark; and
   wherein the hub and first detector mating structures are configured to slideably receive the projecting structure, wherein the projecting structure extends through the hub to slideably engage the detector, so as to align the index mark of the coding member with the index sensor of the detector in a first positional arrangement between the hub and first detector mating structures.

19. The encoder assembly of claim 18, wherein the detector further comprises a second detector mating structure wherein the first and second detector mating structures are arranged substantially symmetrical with respect to the hub.

20. The encoder assembly of claim 18 comprises a six-channel encoder.

* * * * *